US007734536B2

(12) United States Patent
Amrhein et al.

(10) Patent No.: US 7,734,536 B2
(45) Date of Patent: Jun. 8, 2010

(54) SYSTEM, METHOD AND COMPUTER PROGRAM PRODUCT FOR WORKFLOW-BASED DATA PROCESSING

(75) Inventors: Peter Amrhein, Uetikon am See (CH); Rene Walser, Wangs (CH)

(73) Assignee: UBS AG, Zurich (CH)

( * ) Notice: Subject to any disclaimer, the term of this patent is extended or adjusted under 35 U.S.C. 154(b) by 562 days.

(21) Appl. No.: 11/482,896

(22) Filed: Jul. 10, 2006

(65) Prior Publication Data

US 2007/0067308 A1 Mar. 22, 2007

(30) Foreign Application Priority Data

Aug. 22, 2005 (EP) .................................. 05018199

(51) Int. Cl.
*G06Q 40/00* (2006.01)
(52) U.S. Cl. ............................. 705/38; 705/35; 705/4; 705/8; 705/9; 705/11; 705/7; 705/40; 705/16; 705/17; 705/39; 707/10
(58) Field of Classification Search .................... 705/38, 705/35, 4, 8, 9, 11, 7, 40, 16, 17, 39; 707/10
See application file for complete search history.

(56) References Cited

U.S. PATENT DOCUMENTS

| 5,301,320 | A | 4/1994 | McAtee et al. .............. 395/650 |
| 6,505,176 | B2 * | 1/2003 | DeFrancesco et al. ......... 705/38 |
| 6,625,651 | B1 | 9/2003 | Swartz et al. |
| 2002/0040312 | A1 | 4/2002 | Dhar et al. |
| 2002/0174238 | A1 | 11/2002 | Sinn et al. .................... 709/229 |
| 2002/0194181 | A1 | 12/2002 | Wachtel ....................... 707/10 |
| 2003/0055668 | A1 | 3/2003 | Saran et al. |
| 2005/0044197 | A1 | 2/2005 | Lai |

FOREIGN PATENT DOCUMENTS

EP 0 778 535 A2 6/1997

OTHER PUBLICATIONS

European Office Action Dated Dec. 18, 2006.
Classen I et al: Towards evolutionary and adaptive workflow systems-infrastructure support based on Higher-Order Object Nets and CORBA Proceedings International Enterprise Distributed Object Computing Workshop, Oct. 24, 1997, Sieiten 300-308, XP002135793.
Purvis M et al: "A Framework for distributed workflow systems" System Sciences, 2001. Proceedings of the 34th Annual Hawaii International Conference on Jan. 3-6, 2001, Piscataway, NJ USA, IEEE, Jan. 3, 2001, Seiten 3727-3734, XP010550036. ISBN:0-7695-0981-9.
European Search Report Dated Oct. 7, 2005.
International Search Report Dated Nov. 13, 2006.

* cited by examiner

*Primary Examiner*—Daniel S Felten

(57) ABSTRACT

An approach to workflow-based data processing is described, wherein as part of the workflow a multiplicity of display pages is executed interactively by means of workflow control commands. A suitable computer system comprises at least one user terminal with a user interface for page display (802) and for input of user data and workflow control commands, one or more basic systems with associated basic databases, containing basic data, at least one cache database in which the user data and a selected extract from the basic data are cached (806), one or more service systems with services (810) for performing data processing steps on the basis of data sourced from the cache database and a mechanism (804) for generating a request directed at the invocation of at least one service (810) as a response to a workflow control command. The service (810) is invoked asynchronously in respect of the display of a new display page if the setup of the new display page is independent of the result of the service (810) invoked by means of the request.

23 Claims, 8 Drawing Sheets

SYSTEM, METHOD AND COMPUTER PROGRAM PRODUCT FOR WORKFLOW-BASED DATA PROCESSING

FIELD OF THE INVENTION

The invention relates to the field of data processing using workflows. Put more precisely, the invention relates to a system, a method and a computer program product for workflow-based data processing with reduced response times.

BACKGROUND OF THE INVENTION

A workflow is understood quite generally as a processing operation composed of several operating steps, undertaken by one or more people responsible for the processing. The operating steps usually have to be executed in a previously defined order. Execution of a new operating step normally assumes that one or more preceding operating steps have been fully executed. This necessity arises from the fact that the result of the preceding operating steps is used in the new operating step and therefore influences it.

An example of one processing operation composed of a multiplicity of operating steps is the processing of a credit application illustrated in FIG. 12. FIG. 12 gives a rough summary of the individual operating steps and the roles of the people involved in processing the granting of credit. In total three different processing roles are involved in the processing. The people responsible for the care of customer relations are called advisers. Advisers work at the "front", in "advice" and in "marketing". Credit decisions—if they cannot be decided immediately by advisers—are ultimately made by credit officers (COs). Credit officers are often also designated as decision-makers. Finally, ultimate handling—drawing up the contract, payments, etc.—is undertaken by specialists in the credit services (CS) organisation.

In the advisory interview held by the adviser with the customer (the opposite party), among other things the customer's credit needs are determined. The adviser registers the credit applications determined in the advisory interview. If there are changes, with hardly any or no risk attached, to existing credit commitments, to minimise the amount of work a full risk assessment of the customer's position (full decision) is dispensed with. Low-risk changes of this kind are identified by performing a prior assessment (triage). The prior assessment is done for each application. If it is possible to dispense with a full decision for all the applications of an opposite party combined in a submission, they can be directly supplemented by the information relevant to the handling and released for handling. New transactions, on the other hand, always require a full decision. Financing potential (with commercial customers) or affordability (with private customers) applies here as a measure of the credit standing of a customer.

For the decision as to whether and under what conditions the desired credit can be granted to a customer, the credit application (possibly consisting of several individual applications)—together with the, in some circumstances, already existing credit commitment—is balanced against the creditworthiness and the securities, in other words the credit standing of the customer. To assess the customer's applications and in particular his creditworthiness, value is attached to an overall customer profile. Logically the credit commitment of the later contracting partner does not effect the assessment in isolation. Rather, the legal bodies legally or commercially associated with the customer and, if available, their applications are also involved in the assessment. All the customers who need to be involved in the creditworthiness analysis constitute the "opposite party to be submitted". Simultaneously running applications of an opposite party form a submission. Only one open (undecided) submission per opposite party is permitted at a time. Applications with no prospect are excluded from the further credit granting process from the start by means of a checklist.

The adviser is supported in his decision by a decision plan defined in advance. The registered figures and responses have an effect on this and they end in a categorisation of the submission (in white, grey or black), In a "white" decision, with sufficient authority the adviser can approve the submission at once. The responsibility for the decision is in this case entirely that of the adviser. Once the adviser has approved the submission, handling of the credit granting process is continued immediately. If there is a grey or black system decision or if there is too little authority a CO decision is necessary. If the adviser endorses the submission he forwards it immediately to a CO with his reasons.

The CO analyses the submission using the information registered by the adviser, his assessments and any enclosures. The extent of the registration and the documents to be supplied with it are configured so that the CO can decide on the submission as far as possible without referring questions back to the adviser.

The CO can approve the submission unchanged, approve it with changes, approve it with conditions, refuse or reject it. If the adviser's assessment is incomplete or if it obviously does not represent the current view of the customer or his securities, the CO rejects the submission. If a submission comprises both uncritical applications, which the CO can simply approve, and applications, the approval of which he wishes to link to conditions, he can also make his decision per application instead of for the entire submission. Moreover, the CO can also set measures and deadlines which the adviser must put into practice. The CO then returns the entire submission to the adviser.

In a next processing step the adviser then has to put into practice or accept the CO decision. This step depends on the CO's decision. If he has approved the submission (or individual applications) unchanged, the decision is concluded and the adviser continues to complete the handling. If the CO has approved the submission with changes, the adviser must confirm the CO's changes before "completion of handling" or can put in an application for reconsideration. If the CO has approved the submission with conditions, the adviser puts the conditions into practice in consultation with the customer. If the adviser or the customer does not agree with the conditions, the adviser can put in an application for reconsideration. If the CO has refused the submission and the adviser does not agree with the CO's refusal, in this case too he puts in an application for reconsideration. Otherwise the adviser confirms the CO's refusal decision. If the CO has rejected the submission, the adviser can draw up a new submission. The applications and latest adaptations to the customer profile drawn up as part of the rejected submission are adopted into the new submission.

If the adviser has put into practice all the CO's conditions or if he puts in an application for reconsideration for the entire submission or individual applications from it, he returns the entire submission to the CO. If some of the applications in the submission have already been approved, these can be completed for handling and put in for handling if this has been approved by the CO. If the submission or parts of it have been approved, the adviser establishes the concrete products and conditions, sets the prices and supplements additional information which is not relevant to the decision, but is relevant to the handling. In this the adviser keeps within the framework approved for the decision. The specialist in credit services finally handles the individual applications.

With the advance of electronic data processing many workflows so far executed manually are being imitated in a computer-aided environment. Within the framework of the computer-aided workflows, users navigate through a multiplicity of screen pages on which they are requested to input data or confirm data. It has emerged that with conventional electronic implementation of the workflow illustrated in FIG. 12 and similarly complex workflows the system response times are frequently unacceptable. This applies above all if many user accesses take place in the case of large banks and other large companies and an extensive already existing data pool is to be used.

The object of the invention is therefore to provide an easily scalable system and method which permit run-time-optimised processing even of complex computer-aided workflows.

SUMMARY OF THE INVENTION

This object is achieved according to a first aspect of the invention by a computer system for workflow-based data processing in particular in association with a computer-aided credit decision, wherein as part of the workflow a multiplicity of display pages is interactively executed by means of workflow control commands. The computer system comprises at least one user terminal with a user interface for the page display and for the input of user data and workflow control commands, one or more basic systems with associated basic databases containing basic data, at least one cache database into which the user data and a selected extract of basic data are loaded, one or more service systems with services for performing data processing steps on the basis of data sourced from the cache database and a mechanism for generating a request directed at the invocation of at least one service as a response to a workflow control command, wherein the service is invoked asynchronously in respect of the display of a new display page if the setup of the new display page is independent of a result of the service invoked by means of the request, and at least one queue for serialisation of (at least) the requests directed at asynchronous service invocations.

The use of a cache database enables caching of the data required by the services. It is then possible to access the cached data as part of the services running asynchronously in respect of the page setup. This combination shortens run-times and leads to faster page setup. In order to avoid any collisions of asynchronously running services, additionally at least one more queue can be provided to serialise the requests directed at asynchronous service invocations. In the case of synchronous service invocations, the requests directed at them can likewise be serialised in this queue or in a separate queue.

According to one configuration, at least one worker process is arranged functionally between the at least one queue and the service systems. The worker process is provided to read out the queue and to forward the read out requests to the service systems. The worker process can also take on further tasks, such as format conversion or validation of data objects.

Both data in the cache database and one or more services can be allocated to the individual requests. In such a case the worker process is preferably constructed, after a request from the queue has been read out, to read out from the cache database the data allocated to the request and forward them to the service allocated to the request.

The worker process may receive a response from the service system to which a request has been forwarded. According to a first variant the response is directed at the status of the execution of the request, so the worker process can perform an appropriate status entry in the queue for the requests or in a separate response queue. According to a further variant, the response contains a validation message in respect of the data passed to the service system. Said variants can be combined with one another and with the following third variant in any way.

According to the third variant the response contains service data passed on by the service system, which the worker process writes into the cache database. The cache database then acts as a "post box" in which the service data received back from asynchronously invoked services are intermediately stored. The intermediately stored service data can then be read out from the cache database at a later time (possibly when the setup of a page is requested, whose setup is based on the service data).

The service systems may comprise service databases for data storage. It is thus conceivable to store the user data input by users (relating e.g. to a certain transaction case which is the subject of the workflow) in the service databases. These user data can then be reloaded into the cache database at a later time if required (e.g. after unintentional deleting of the cache database or after intentional deleting following a renewed invocation of the transaction). Additionally or alternatively to the user data, the service data generated by the individual services can be stored in the service databases.

The workflow control commands may comprise a storage command. Additionally or alternatively to this, the workflow control commands may comprise a command to display a new display page. The new display page is, for example, the display page following logically in the workflow.

The basic data loaded into the cache database (and optionally also the data input by users or other data contained in the cache database, such as, e.g., service data) may have limited validity. It is conceivable, for instance, that at least the basic data loaded into the cache database are deleted at certain (e.g. regular) intervals and that re-sourcing of at least the basic data then takes place. Deletion takes place, for example, each night. Re-sourcing of data can take place following each deletion operation. Additionally or alternatively to this, the resourcing of data can take place on invocation of a particular transaction.

As already explained, the computer system optionally comprises one or more queues. The queues are preferably in pairs, wherein the requests for successive read out are written into a first queue and status protocolling of the service or services linked to a request takes place in a second queue. The second queue can provide a reference point for whether a particular request (and/or the service linked thereto) has already been executed or is still being processed. The queues may be located at the level of the cache database (e.g. in tabular form). However, they can also be implemented independently of the cache database by means of a separate component.

Additionally to the asynchronous requests, synchronous requests may also be provided in the computer system. In this way a request directed at the invocation of at least one service running synchronously in respect of the display of the new display page can always be generated if the setup of the new display page is dependent on a result of the service invoked by means of the request. The synchronous and asynchronous requests can be serialised in separate queues or in a common queue.

According to a further aspect, the invention is directed at a method for workflow-based data processing in particular in connection with a computer-aided credit decision, wherein as part of the workflow a multiplicity of display pages is executed interactively by means of workflow commands. The method contains the steps: providing at least one user terminal with a user interface for the page display and for the input of user data and workflow control commands, providing at least one cache database into which the user data and an extract of basic data selected from at least one basic database are loaded, providing services for performing data processing steps on the basis of data sourced from the cache database, generating a request directed at the invocation of at least one service as a response to a workflow control command, the service being invoked asynchronously in respect of the display of a new display page if the setup of the new display page is independent of a result of the service invoked by means of the request. Optionally at least the requests directed at asynchronous service invocations can be serialised by means of at least one queue.

The service data received back from the services as the response to a request can be stored in the cache database. The cache database can in this case be used as a "post box" for the service data.

Loading of the basic data extract into the cache database can be done iteratively. The contents of the basic data read out from the basic database may, for instance, contain instructions for basic data to be additionally loaded. Instructions of this kind cab be identified only after a first loading operation and processed (by reloading basic data). The reloaded basic data may also in turn contain instructions of this kind. Only the provision of the cache database enables an iterative loading operation of this kind.

The invention can be implemented as a hardware solution, a software solution or as a combination of both solutions. As far as a software solution is concerned, the invention is directed at a computer program product with program code means for performing the method when the computer program product is running on a computer system. The computer program product can be stored on a computer-readable recording medium.

BRIEF DESCRIPTION OF THE DRAWINGS

Further advantages, details and further developments of the invention emerge from the following description of a preferred embodiment and from the drawings.

DESCRIPTION OF A PREFERRED EMBODIMENT

The invention is explained below using a preferred embodiment of the computer-aided processing of a credit application as part of a standard credit process (SCP). The aspects on which the invention is based can, however, be used in connection with other workflows.

Before a more detailed explanation of the embodiment, first the pairs of terms serial and parallel and synchronous and asynchronous, decisive for understanding the invention, are explained. The explanation is done using requests sent by a first system component to a second system component.

Figure 1:
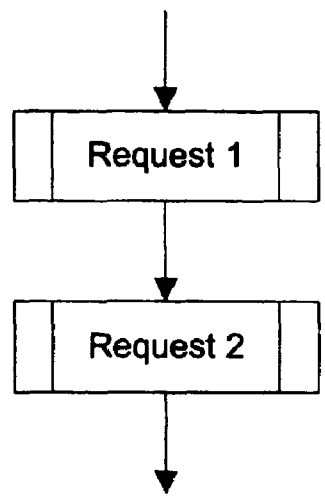
FIG. 1 shows a schematic illustration of the serial execution of two requests.
Figure 2:
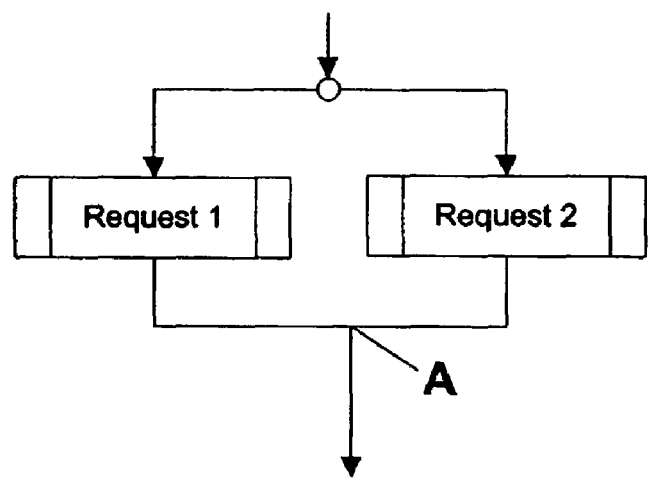
FIG. 2 shows a schematic illustration of the parallel execution of two requests.
Figure 3:
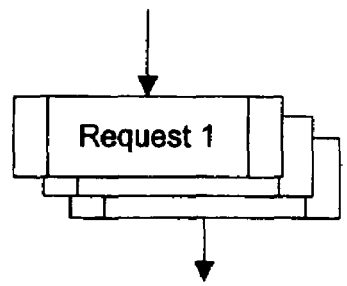
FIG. 3 shows a schematic illustration of the parallel execution of similar requests.

Two requests run sequentially if the requests are executed in succession (FIG. 1). On the other hand, two requests run parallel if at any time in the processing of the first request the second request is executed simultaneously (FIG. 2). The point marked as 'A' in FIG. 2 is an (optional) synchronisation point. At this place the processing of the two requests must be concluded before the sequence can be continued. FIG. 3 shows the case where the same request is carried out in parallel for different objects (e.g. parallel storage of several electronic documents).

Figure 4:
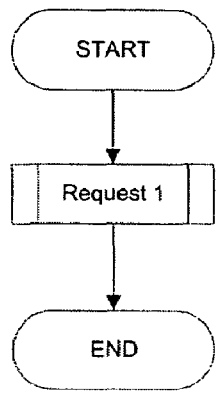
FIG. 4 shows a schematic illustration of the synchronous execution of a request.

For a definition of the terms synchronous and asynchronous it is necessary to consider the invoking function or the invoking process. A request is carried out synchronously if the invoking function waits for termination of the request. A synchronous sequence is illustrated in FIG. 4: a user activates, e.g. a "save and continue" button on a displayed screen page. The application thereupon invokes the request "request 1" and cannot illustrate the next screen page until the request "request 1" has been executed.

Figure 5:
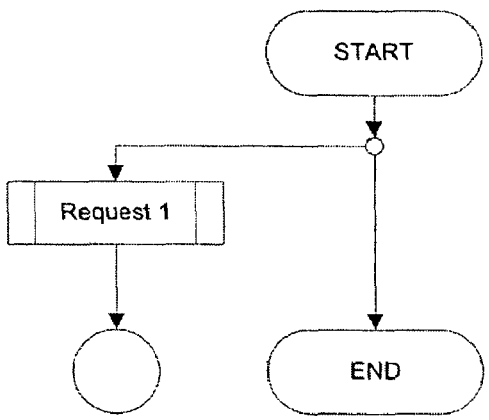
FIG. 5 shows a schematic illustration of the asynchronous execution of a request.

A request is carried out asynchronously if the invoking function starts the request but does not wait for it to terminate. An asynchronous request is illustrated in FIG. 5: a user activates e.g. a "save and continue" button on a displayed screen page. The application starts the request "request 1" and presents the next page without waiting for termination of the request "request 1".

Figure 6:
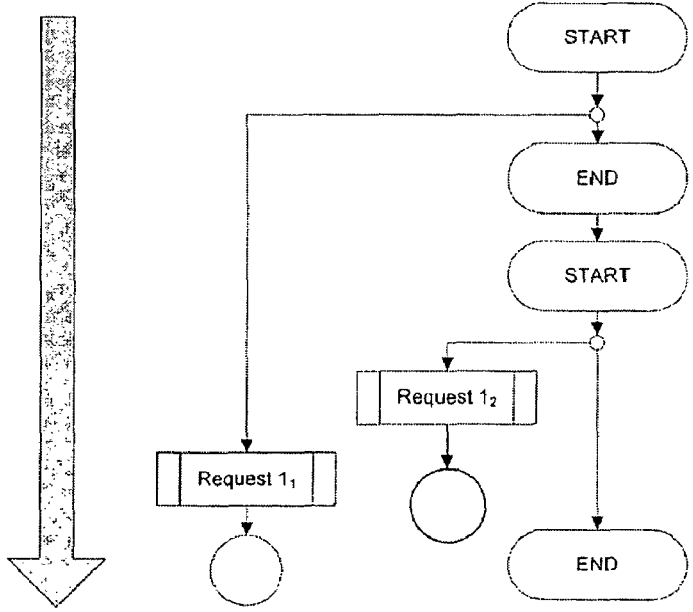
FIG. 6 shows a schematic illustration of two asynchronous requests which are not serialised.

In asynchronous operations, in the present embodiment similar requests are to be prevented from "overtaking" one another if they are not serialised. Similar requests are understood to be, e.g., requests which access the same fields of a table. There follows an example of this depicted in FIG. 6 (for simplicity's sake it is assumed in the example that an invocation is carried out twice in immediate succession). The grey-coloured arrow symbolises the chronological sequence, i.e. a request located further down is carried out later. With varying processing times conditional on the system it can occur that request $1_1$, triggered first, is not executed until after request $1_2$. If the individual requests contain, for example, write accesses to a database, there is a danger that more up-to-date data of request $1_2$ are overwritten by obsolete data of request $1_1$. One way of evading this problem is to implement a queuing algorithm which is responsible for the "serialisation" and if necessary also the synchronisation (cf. FIG. 2) of similar requests.

Figure 7:
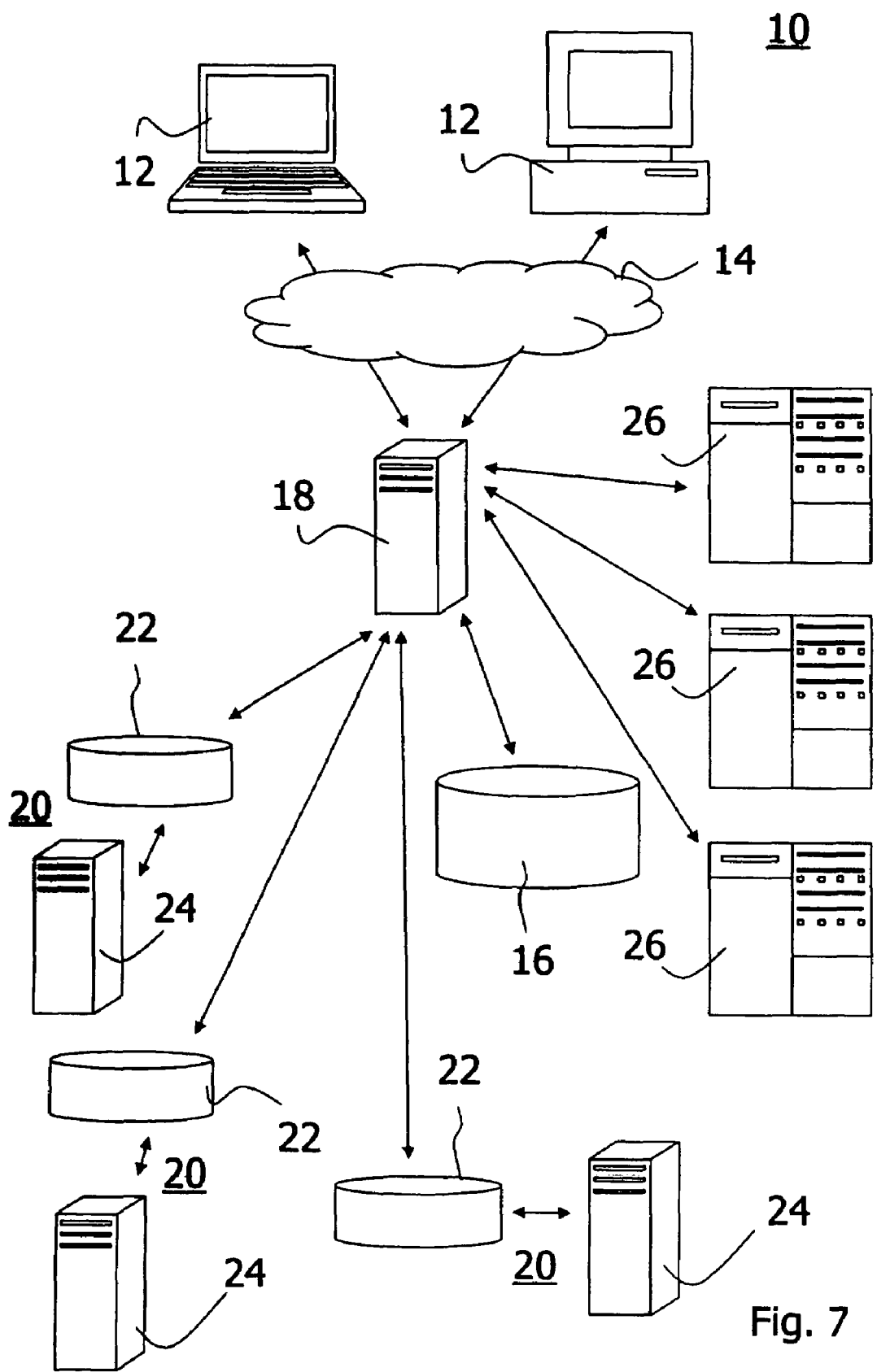
FIG. 7 shows a schematic illustration of a system according to an embodiment of the invention.

FIG. 7 shows an embodiment of a computer system 10 for workflow-based data processing. The computer system 10 comprises several user terminals 12. On each of the user terminals 12 runs a web browser which can process websites written in hypertext markup language (HTML) and display them on screens of the user terminals 12. The user terminals 12 therefore act from the user's point of view as a web front end (WFE) in each case.

The user terminals 12 have access to a central cache database 16 via a network 14 (e.g. an intranet or the internet). Access to the cache database 16 takes place via a server 18. Application programs run on the server 18 on the one hand (from the point of view of the user terminals 12). On the other hand programs for managing the database 16 also run on the server 18. In an alternative embodiment the programs for managing the database 16 run on a separate database server (not illustrated).

On the one hand application input data which have been input by users by means of the user terminals 12 are loaded into the cache database 16. On the other hand, an extract of basic data is loaded into the cache database 16 as a function of the user inputs and the information needs of services positioned downstream. The basic data are sourced from basic systems 20. Each basic system 20 contains a separate basic database 22 for storing the basic data and a server 24 allocated to the respective basic database 22 for managing the basic data. The basic data are comparatively long-life data which are not, or at any rate not frequently, modified. The basic systems 20 are accessed not only by the cache database 16, but also by a multiplicity of further systems, not illustrated in FIG. 7, which enable servicing of the basic data or likewise process the basic data.

In connection with the SCP the basic data comprise, for example, customer data (including customer profile data on the legal structure of a conglomerate of corporate customers) held in a first basic database 22. In a second basic database 22 basic data about existing customer commitments (including data on already existing mortgages and/or credits of a particular customer) are held. Further basic data, namely objects pledged as securities, are held in a third basic database 22. From a banking point of view, all the objects pledged as securities fulfill the same purpose for the bank. They act as security for credits for it. In the third basic database 22 the individual objects pledged as securities (e.g. portfolio values, sureties, credit balances) are allocated to the cover contracts, i.e. current credits or applications, via cover quotas.

The computer system illustrated in FIG. 7 further comprises several server systems 26 with write/read access to the cache database 16. Each server 26 makes available the processing logic by one or more services. In the present embodiment this is the processing logic for executing SCP. Some or all the servers 26 may be allocated their own service database (not illustrated).

The basic data loaded into the cache database 16 have a limited validity. The limitation of the validity is of significance for guaranteeing that the basic data processed by the servers 26 in each case are up-to-date. In many application scenarios (and above all in SCP) the fact that the data are up-to-date is an important guarantor for obtaining a reliable processing result. In the credit assessment the fact that the data are up-to-date is additionally accompanied by minimisation of the risk of credit failure. In the present embodiment the fact that the data are up-to-date is guaranteed in that the extract of basic data (or part of it) in the cache database 16 is regularly deleted and following this, e.g. by file transfer (e.g. for master data such as customer data or customer profile data) or synchronously (e.g. on invocation of a particular transaction from a service database), re-sourcing of data takes place from all or a selection of the basic databases 22 and any service databases. The re-sourcing of data by file transfer takes place each night, for example, so that a current daily extract of basic data can be made available by the cache database 16.

Figure 8:
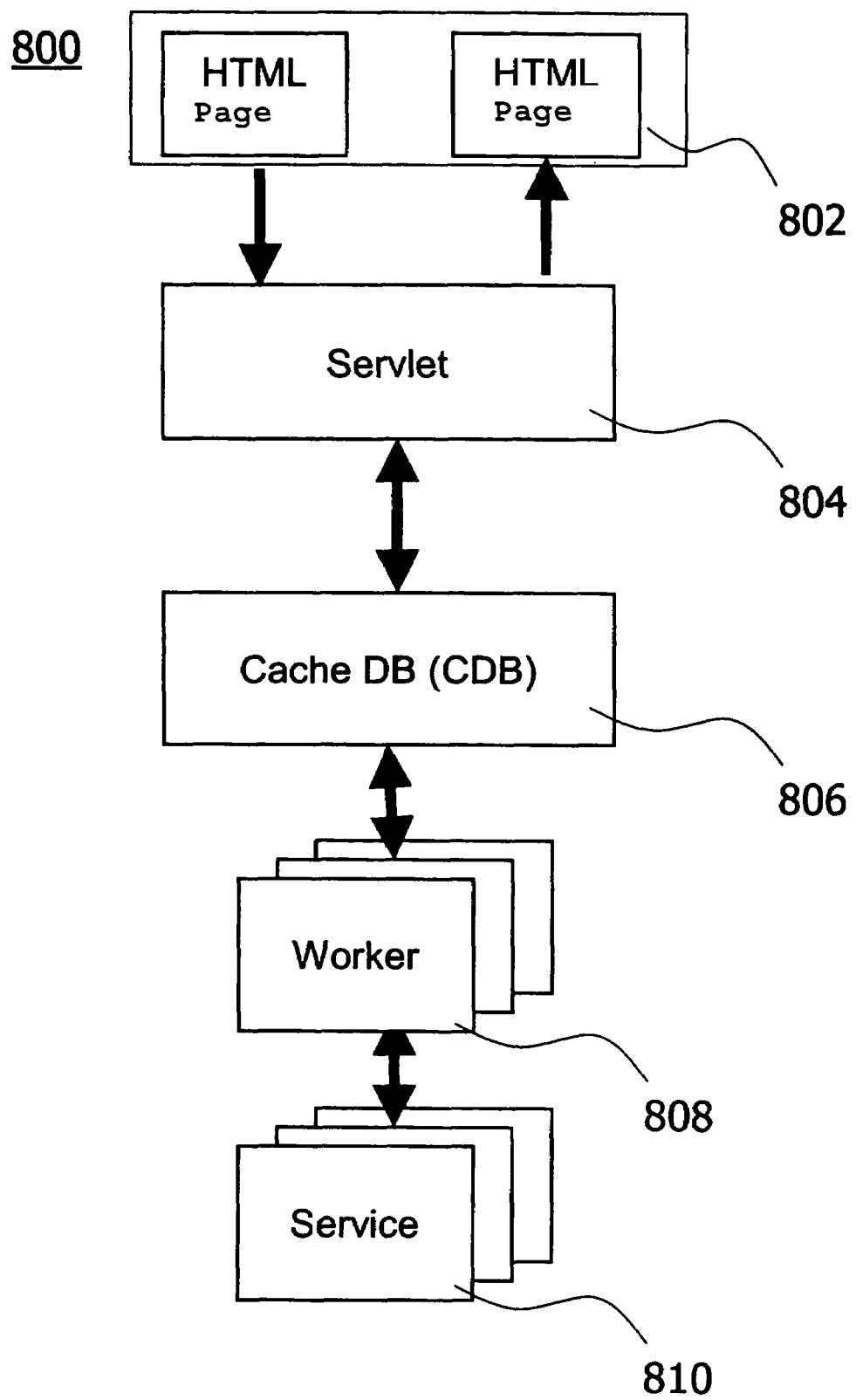
FIG. 8 shows a schematic illustration of the functional components of the system according to FIG. 7.

In FIG. 8 the distribution of tasks 800 of the components of the computer system 10 according to FIG. 7 is illustrated schematically and divided into various layers. The user terminals 12 illustrated in FIG. 7 contain a user interface 802 in the form of a WFE (top layer). The WFE permits the presentation of HTML pages. Data are input and output by means of the HTML pages. The data input is supported by graphic mandatory field indicators. An important component of each HTML page is a navigation aid. The navigation aid shows the user at what point of a workflow comprising several stations he is at that moment. On the user interface layer 802 a first data validation further takes place in the form of a format check (by means of Java script). The format check ensures, e.g. that a correct data format is being used. In the event of incorrect inputs an appropriate message (e.g. in the form of a pop-up) is displayed.

Below the user interface layer 802 is a user program ("user layer") in the form of a Java servlet 804. The servlet 804 runs on the server 18 and takes on the writing of data to the cache database 16 and the reading of data from the cache database 16. Furthermore, the servlet 804 creates the HTML page for the user interface layer 802, provided on the basis of the respective data combination, and comprises the relevant processing logic. A further task of the servlet 804 is initiating and coordinating different types of request. For the event that, after input of a workflow control command on a first HTML page (e.g. by activating a "save and continue" button), one or more synchronous requests are encountered, the servlet 804 ensures that the next HTML page is not displayed until all the synchronous requests have been executed. In other words, the servlet 804 waits to generate the next HTML page until there is a system response for each started synchronous request. In the case of one or more asynchronous requests it is not necessary to wait to display the next HTML page until there is a system response to the asynchronous request or requests. However, it may be that certain functionalities are not available until the asynchronous request or requests has/have been executed. In such a case the servlet 804 ensures that the functionality is not made available at the user interface layer 802 until the asynchronous requests concerned have been executed.

Below the layer of the servlet 804 a database layer 806 is provided with the cache database 16 illustrated in FIG. 7. The cache database 16 comprises a multiplicity of relational tables into which data are written and from which data are read. The cache database 16 therefore provides the data pool for various service requests and sends the appropriate requests to the layer located below (worker layer 808). A further task of the database layer 806 is to perform validations of data objects and to invoke any object follow-up processing (e.g. data can be newly loaded or re-loaded from the basic systems for integrity servicing). The database layer 806 is additionally responsible for compiling the data for presenting an HTML page (in other words for compiling specialist data, any messages and data for the setup of a workflow summary presentation on the HTML page).

Also located at the database layer 806 are two separate queues. New service requests are written into a first queue. In a second queue entries take place if a service requested by means of a request has been concluded. The request status can consequently be identified from the second queue. In the present embodiment the queues are implemented as special tables in which a new data set (record) is created for each request. The data set created for a record contains in each case a user session ID (for allocating a request to a particular user terminal 12), a type of record (indicating the service to be invoked and the data to be passed to the service in each case) and also a continuously assigned serial number for serialisation purposes. The record entries for a particular request are triggered by the servlet 804.

As already mentioned, the service requests are passed to the worker layer 808 located below from the database layer 806 by means of queues. The Java-based worker layer 808 reads out the request queue, executes the read out service requests and invokes the appropriate services with the data (basic data and/or input data) from the cache database 16. The worker layer 808 further writes the service data and service messages received from the services in response to the service requests back into the cache database 16. The cache database 16 acts in this respect as a request-related "post box", from which the service data and messages can be invoked as required (e.g. with synchronous or asynchronous setup of a new page).

A further task of the worker layer 808 is mapping different data structures between the database layer 806 located above on the one hand and a service layer 808 located below on the other hand. The worker layer 808 further enables load distribution (e.g. at request peaks) and improves the scalability of the overall system with a growing number of user terminals and service accesses.

The service layer 810, finally, constitutes the bottom layer in the schematic illustration according to FIG. 8. The service layer 810 contains the servers 26, illustrated in FIG. 7, which make available the respective processing logic (e.g. in C++) and furthermore are responsible for technical and specialist validations. One or more databases (not illustrated) can be allocated to each or some of the servers 26 on the service layer 810 for storing service data.

Figure 9:
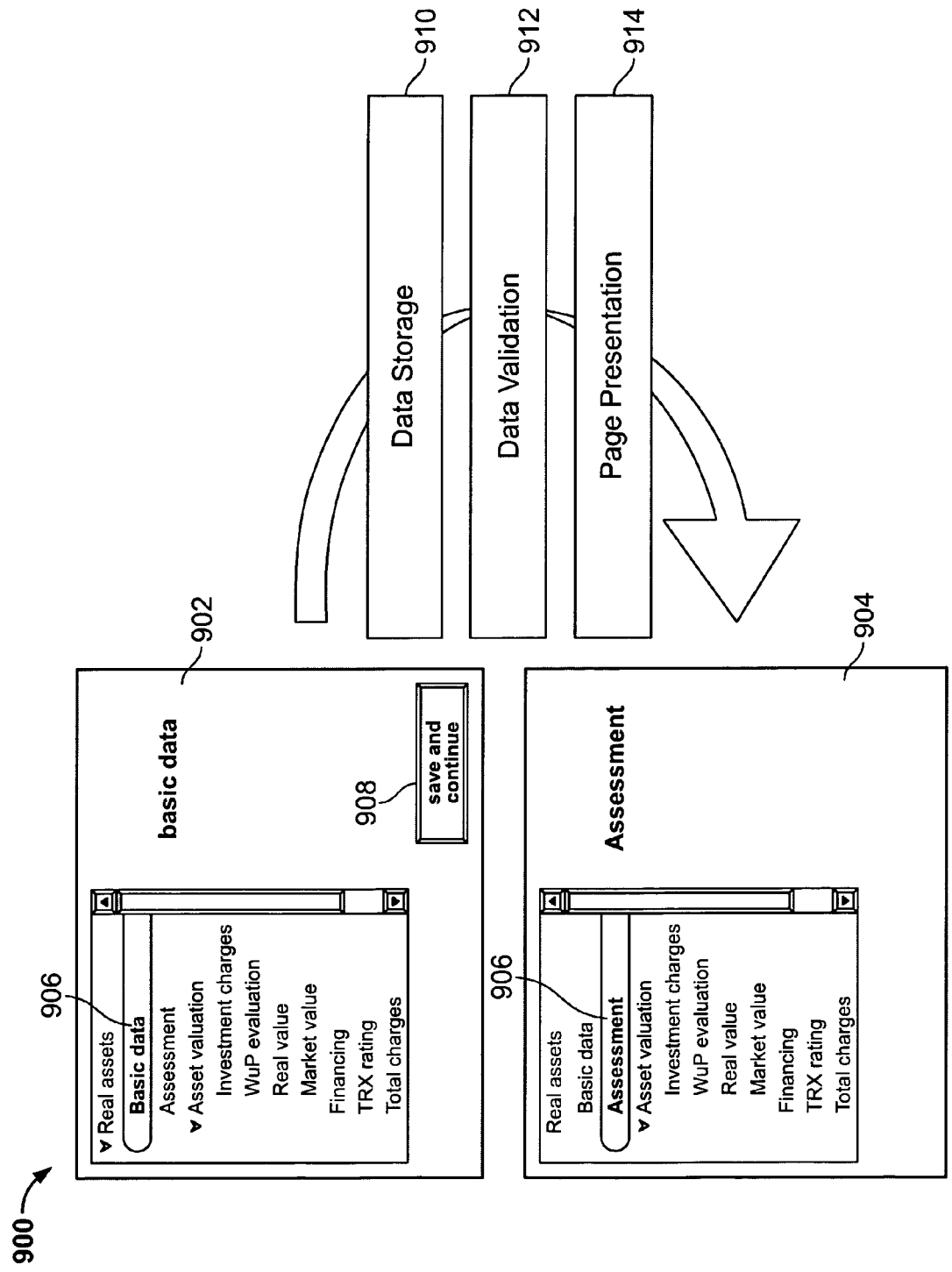
FIG. 9 shows a schematic flow diagram depicting the mode of operation of the system according to FIG. 7.

In FIG. 9 a detail of a workflow 900 is illustrated as an example in connection with the SCP. The workflow 900 concerns the registering or re-assessment of real assets (immovables) acting as securities for a credit application. In total the workflow 900 comprises a multiplicity of individual stations, two of which are shown in FIG. 9.

Looked at in general, the detail illustrated in FIG. 9 shows the transition, already indicated in FIG. 8, from a first workflow station (first HTML page 902) to a second workflow station (second HTML page 904). Each HTML page 902, 904 comprises a navigation aid ("navbar") 906, which indicates the current station of the workflow 900 and the direct jump to (allowed) stations other than the logically next one. The first HTML page 902 enables the registering of basic data of real assets, while the second HTML page 904 requests an input of assessment data for the real assets. For the sake of clarity the data input fields of HTML pages 902, 904 are not illustrated in FIG. 9.

For input of a workflow control command HTML page 902 has a control element 908 in the form of a "save and continue" button. After (full) input of the user data (e.g. transaction data) by a user, the transition to a new station of the workflow is initiated in that the user activates the control element 908 with a pointer device (e.g. a mouse). Following activation of the control element 908, after format validation of the user data, storing of the input data in the cache database takes place still on HTML page 902 (not illustrated) in a step 910 and one or more service requests are started. Then the input data are validated in the database layer (step 912). If the requests are synchronous requests, the next HTML page 904 is displayed only after successful processing of these requests. In the case of asynchronous requests the next HTML page 904 is displayed immediately after initiation of these requests. Display of HTML page 904 is done in both cases in step 914. It can be clearly seen that in the navigation aid 906 on HTML page 904 the menu point "basic data" (not to be confused with the data sourced from the basic systems) is marked with a check mark. This means that the user data input has been completed without errors.

On the basis of performance considerations (fast page setup/speedy execution of the individual workflow stations), the service requests not necessarily required for the setup of HTML page 904 (step 914) are carried out asynchronously. If, for example, a data processing operation taking place at service level, the result of which has no influence on the setup of the following page, is connected to a particular service invocation, the data processing operation is started asynchronously. The service is requested by an application running at the user level or the database level (e.g. the servlet 804 illustrated in FIG. 8) to perform a particular task without the application having to wait for the termination of the service invocation before presenting the next page. The data received back from the service are intermediately stored in the cache database until they are required for a later page setup, for example.

However, it can happen that by activating a menu point in the navigation aid 906 the user jumps to a page for the presentation of which a service request previously started asynchronously has to be terminated. An example of this: if the amount of a credit application on an HTML page provided for this purpose ("application definitions") changes and the page is subsequently stored, the lending of the real assets associated with the credit application has to be recalculated. As in the registering of the application data the lending of real assets is not presented on any of the HTML pages to be executed for this, the appropriate calculation invocations can be started asynchronously. If, however, the user changes from the "application definition" page directly (by means of the navigation aid 906) to a real assets summary page, before presentation of this page it must be ensured that all the real assets calculations required have been concluded.

In situations of this kind, if therefore the services necessary for presenting a page have not yet been fully executed, firstly an empty or message page is displayed to the user. At the same time the indication message "The data required for this processing are not yet available. Please wait . . . " is shown. Checking is now continuously carried out in the background as to whether the appropriate services have already been concluded. Appropriate indications can be found, for example, in a status entry, allocated to the service or the corresponding request, in one of the queues. As soon as the service has been concluded, the requested page is automatically presented (and without further user action). The service data possibly required for generating this page are taken from the cache database into which they were read following the termination of the service.

For technical reasons new (synchronous or asynchronous) requests are not initiated until all outstanding requests from a particular user have been executed. If, for example, a user stores a particular application sum for a credit application which is associated with a real asset, when the application is stored an asynchronous request for the real asset calculation process is encountered. If the user changes the application sum, there is a delay in sending a new request until the calculation associated with the storing of the first application has been concluded.

Figure 10:
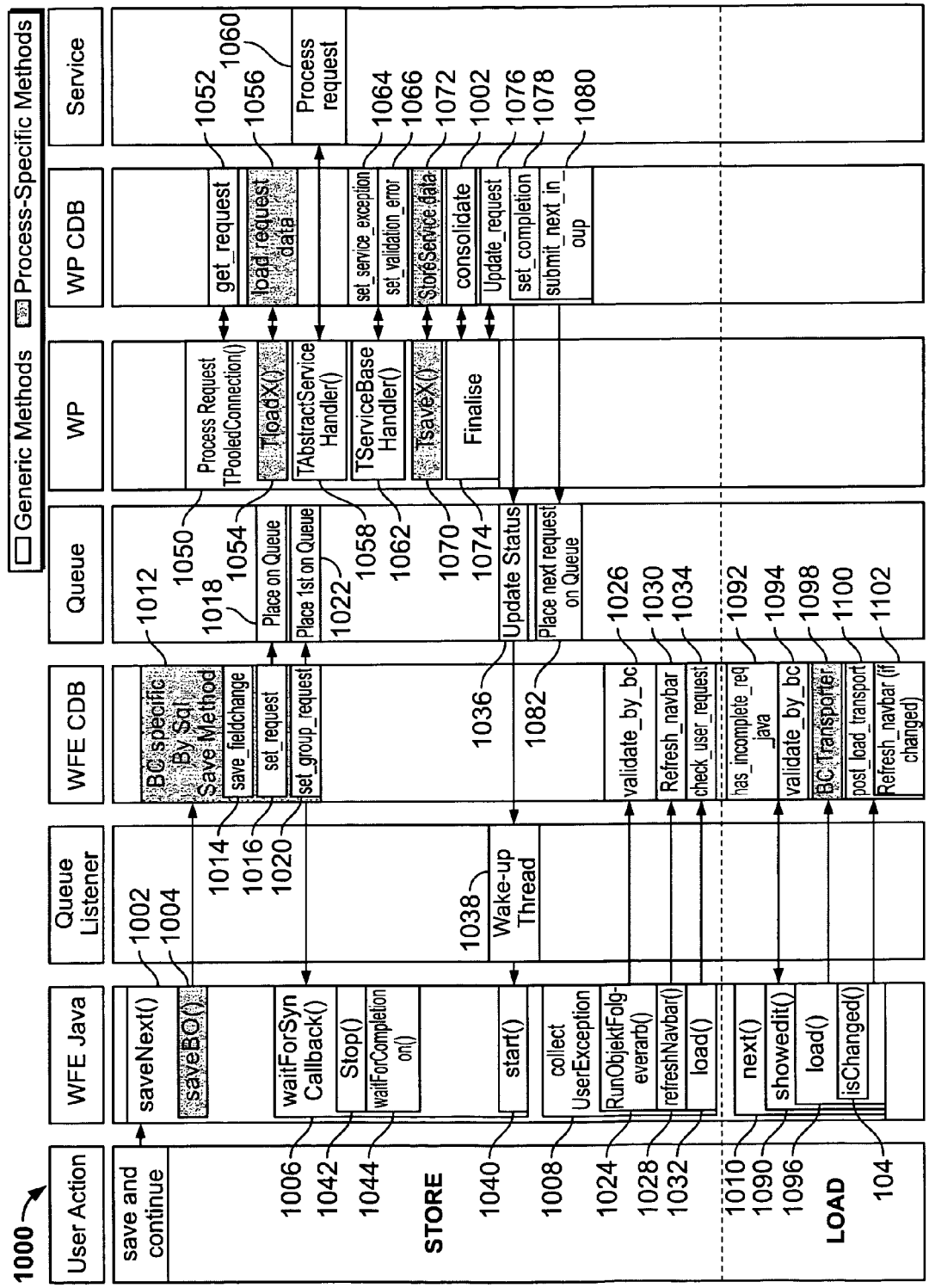
FIG. 10 shows a further schematic flow diagram illustrating more precise details of the mode of operation of the system according to FIG. 7.

The operations illustrated schematically in FIG. 9 are now explained in greater detail with reference to the flow diagram 1000 of FIG. 10. In FIG. 10 in particular the use of queues for implementation of requests is illustrated. In the illustration according to FIG. 10 the functions and methods of the cache database (or the allocated database server) are divided into those made available to the WFE (fourth column from left) and those made available to the worker processes (second column from right). Seen from the point of view of the logical sequence of the individual steps, the second and the third columns from the right could be interchanged.

FIG. 10 shows the individual functions and methods provided for implementation of the steps of data storage 910, data validation 912 and page presentation 914 illustrated in FIG. 9. Additionally explained in FIG. 10 is the mode of operation of queues located at the level of the cache database. At database level there are request and response queues allocated to one another (therefore two separate queues). The queues permit synchronisation of the asynchronous requests, implemented, as explained above, out of performance considerations. As already explained, requests are initiated asynchronously in particular if the service associated with the request has no effect on the presentation of the logically next page. For processing which has an effect on the display of the logically next page, on the other hand, synchronous requests are initiated.

The sequence illustrated in FIG. 10 begins following the data input by activating the "save and continue" button (reference numeral 908 in FIG. 9).

Activating the "save and continue" button starts the Java method saveNext( ) 1002 of the WFE. The method save Next( ) 1002 comprises the methods saveBO( ) 1004, waitForSynCallback( ) 1006, collectUserExceptions( ) 1008 and next( ) 1010. Method saveBO( ) 1004 writes the page-specific input data in the form of a data object into the cache database and in this connection communicates with a PL/SLQ save method 1012 at the level of the cache database. Method 1012 in turn comprises a functionality save_fieldchange 1014 for storing the received input data in relational tables of the cache database. Method 1012 further comprises a functionality set_request 1016, with which a new request (in step 1018) is placed in a request queue which is read by worker processes. The request placed in the queue in step 1018 relates to the request for a particular service linked to the current page and the data input via this page. In many situations several independent service processing steps have to be performed. For this purpose the functionality set_group_request 1020 is provided. This functionality sends a plurality of requests in succession to the worker processes via the queue (step 1022).

At the same time as writing the page-specific input data into the cache database by means of saveBO( ) 1004, the validation process (method collectUserExceptions( ) 1008) is started. Method 1008 has a functionality runObjektFolgeverarb( ) 1024 for invoking the PL/SLQ functionality validate_by_BC( ) 1026 at database level. Functionality 1026 validates per page all the data objects concerned in a storage operation. The validation by means of functionality 1026 recognises if the user has not completely filled in a page. In order to enable recognition of this kind, all the display arrangements of the WFE are also registered in the cache database. If a page has not been completely filled in, an appropriate validation message is generated and presented on the WFE.

The further functionalities refreshNavbar( ) 1028 and refresh_navbar( ) 1030 at the level of the WFE or at database level trigger the re-setup of the navigation aid (reference numeral 906 in FIG. 9) independently of the presentation of a new HTML page. This is a standard functionality of the "save and continue" sequence. The functionalities load( ) 1032 at WFE level and check_user_requests 1034 at database level corresponding to one another convert specific "no data found" service messages, directed at the user, into validation messages in the cache database. Functionality 1034 further enables renewed initiation of failed requests and sending back appropriate error messages for the respective page to the user.

The method waitForSynCallback( ) 1006 of the WFE ensures that there is a delay in carrying out the next Java statement until all the synchronously started requests for the currently requested storage operation have been executed. Method 1006 in this takes advantage of the unequivocal request identifications (MSG_EDs), returned by the PL/SQL function 1020, and the request status model (a concluded request is characterised in step 1036 in the response queue by "FINISHED"). The response queue is continually checked by a method Wakeu Thread 1038 of a monitoring component for changes in status which are then reported to the functionality start( ) 1040 of method 1006. All the time the synchronous request or requests have not been fully executed, method 1006 (by means of the functionalities 1042 and 1044) prevents carrying out of the next Java statement. If only asynchronous requests are initiated in a storage operation, method 1006 is not used.

The worker processes take on the communication between the database levels (queues) and the service level. For this purpose the worker processes comprise the Java method process request TPooled Connection( ) 1050. Method 1050 communicates with the database method get_request 1052, in order to read out from the queue a further request for processing thereof. Method 1052 is invoked continuously in a loop by a worker process as soon as the worker process has finished executing the last request it read out.

Therefore in a first step the worker processes read from the queue a request to be executed, which has not yet been read out. Then by means of the worker method TloadX( ) 1054 the data to be executed by the allocated service are read out from the cache database. For this purpose method 1054 communicates with the database method Load_request_data 1056. This method 1056 loads the data allocated to the request from the database tables and passes them to method 1054. Then the worker method TAbstractService-Handler( ) 1058 invokes the service allocated to the request read out from the queue.

Together with the service request, method 1058 also passes the data read out from the cache database and to be processed to the appropriate service method 1060. After the processing operation has been terminated, method 1060 sends the data received as part of the processing (as far as required) and a message concerning the termination of processing back to method 1058. Additionally, validations are also performed at the service level and the validation results (if necessary) passed to method 1058.

Among the validations at service level which may lead to error messages are technical and "specialist" validations. Exceptional situations which make further processing at service level impossible, for instance, are reported to the user as "technical errors". The message is re-entered by the service and forwarded by the worker processes to the cache database. So that the consistency of the data is maintained, it must be ensured that in the event of a technical error no further processing steps take place at service level. At the WFE level a logic is implemented which checks the number of technical errors after each request, before the process is continued. This logic can (at any rate partially) also be implemented in the worker processes in that, e.g. it is first checked whether all the information required by a service is present in the cache database before a request is forwarded to the appropriate service.

Validations which take into account the contents of several input fields of the WFE are designated as "specialist" validations. The specialist validations comprise comparisons of at least two fields of the same input page of the same object, at least two fields of different input pages of the object and/or at least two fields of different objects. An appropriate validation message appears for each error and page concerned. Additionally or alternatively to specialist validation at service level, specialist validation can take place at database level.

For handling the service-initiated validation messages the worker processes comprise the method TServiceBaseHandler( ) 1062. This method 1062 communicates with methods set_service_exception 1064 and set_validation_error 1066 at database level. Method 1064 inserts specialist validations and mandatory field validations of the services directly into an appropriate table. Validation messages concerning technical service exceptions are additionally inserted into this table by method 1066.

The worker processes additionally contain a method TsaveX( ) 1070, which communicates with a corresponding method StoreService data( ) 1072 at database level. Method 1070 forwards the data received back from the services to the cache database, where they are loaded into the allocated database tables by method 1072.

A further method Finalise 1074 reports to the cache database (method update_request 1076) on the conclusion of the service processing steps. Method 1076 comprises a method set_completion 1078 which updates the status of the appropriate request in the response queue. Furthermore, method 1076 comprises the method submit_next_in_group 1080. This method 1080 causes the next request of a request group to be placed in the request queue.

The WFE method next( ) 1010 is responsible for invoking a cited HTML page. Method 1010 comprises the method showedit( ) 1090, which is responsible for the actual creation of the HTML page based on the implemented display logic and based on the current data combination. Additionally this method 1090 processes page-relevant asynchronous requests and outputs the above-cited message (or an empty HTML page), if all the services started asynchronously required in connection with the current page creation have not been concluded. Method 1090 communicates in this connection with the corresponding database methods has_incomplete_req_java 1092 and validate_by_BC 1094.

Method 1090 comprises the method load( ) 1096, which reads out from the cache database the data and messages required for creating a page. The specialist data are collected at database level by means of the method BC_Transporter 1098. On the other hand, at database level the method post_load_transporter 1100 is responsible for collecting page- and user-relevant validation messages. Method 1100 comprises a method refresh_navbar (if changed) 1102, which passes information for the re-setup of the navigation aid to a WFE method isChanged( ) 1104 responsible for this according to requirement.

Figure 11:
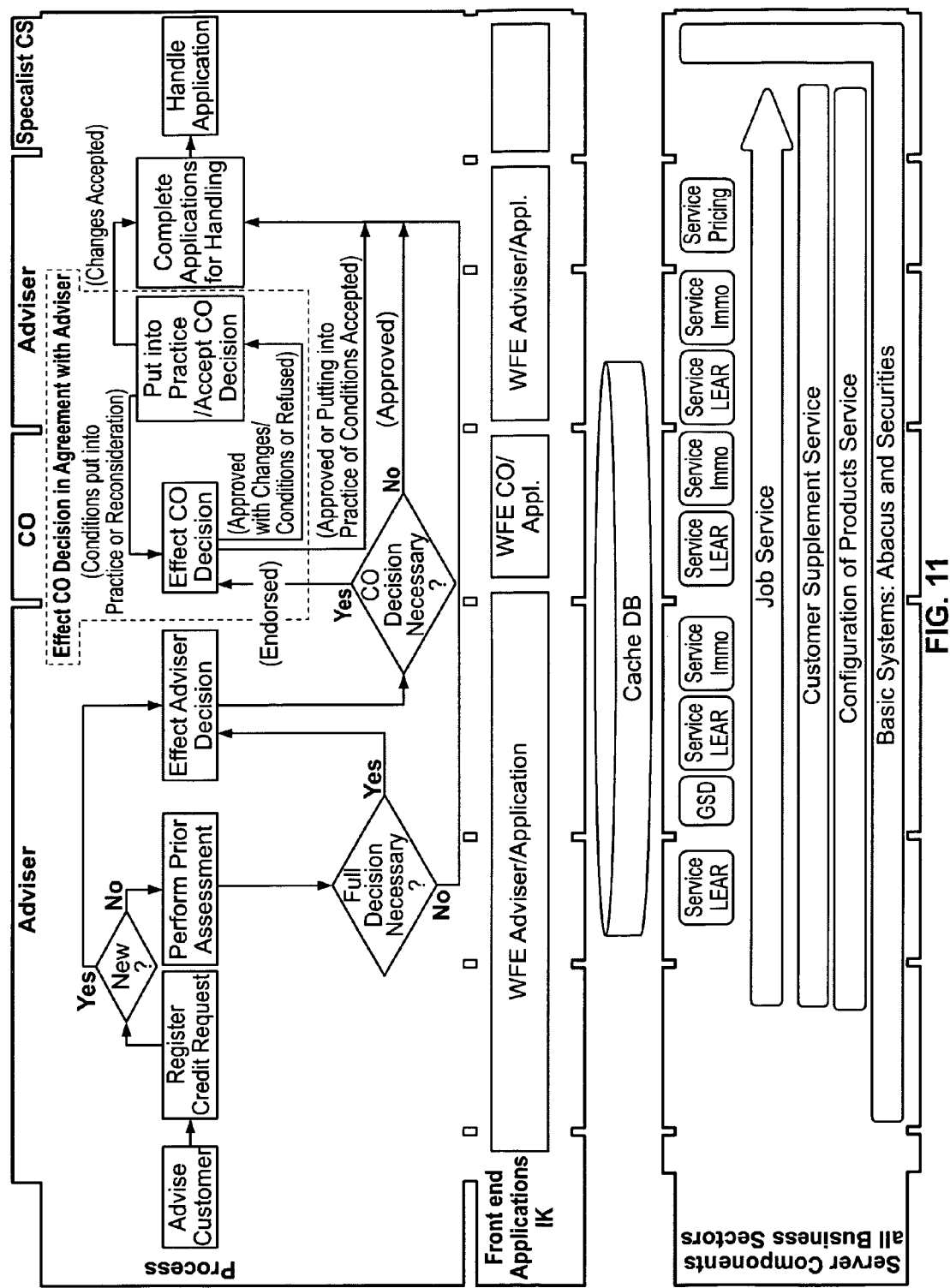
FIG. 11 shows the implementation of the system according to FIG. 7 in a workflow for processing a credit application.
Figure 12:
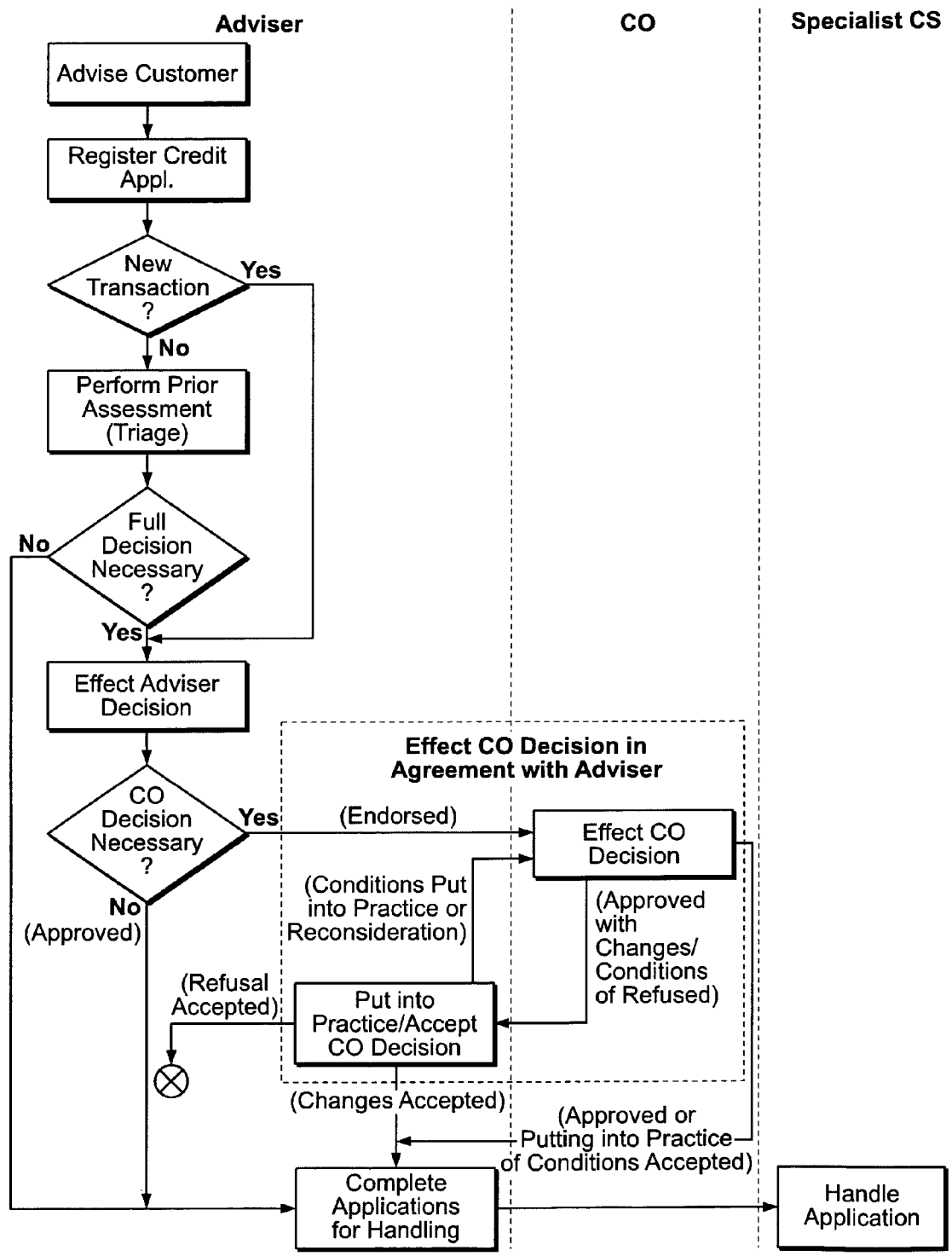
FIG. 12 shows an example of a workflow for processing a credit application involving several people in the processing.

FIG. 11 shows an implementation by way of example of the workflow control mechanism explained above as part of the processing of a credit application illustrated in FIG. 12.

In the top section of FIG. 11 the user roles and workflow stations illustrated in FIG. 12 are cited again ("process"). Below the credit granting process the appropriate WFEs and applications (reference numerals 12 and 18 in FIG. 7) are illustrated. The cache database is in turn located below the applications. Various service systems and basic systems are depicted as the bottom layer in FIG. 11.

The basic systems Abacus and Securities make available the mortgages and security data to be loaded into the cache database and, if required, further basic data. Re-sourcing of the basic data takes place following, e.g. nightly deletion of the cache database, if an adviser or some other person responsible for processing creates a new transaction or wishes to further process, copy, etc., an already existing transaction. The basic data are in this case therefore loaded from the basic databases selectively for a particular transaction. Further data can be selectively loaded into the cache database from the service systems (e.g. related to the transaction).

The service systems are allocated in each case to one or more stations of the workflow illustrated above in FIG. 11. The Job service serves, for example, to collect data relevant to handling in the course of execution of a transaction. The Customer Supplement service serves for additional storage of customer information collected as part of a transaction. The Product Configuration service constututes the product catalogue of the SCP and is a reference system without customer- or transaction-related data. The basic systems serve for re-sourcing and restoring basic data. The LEAR service serves for storing all the data registered in the WFE as well as the automatic prior assessment (triage), the customer assessment, the system decision and recording the history of the decision with all data relevant to the decision.

The GSD service makes available customer data and customer profile data. Though the service GSD is represented here as a "service", it should in fact be allocated to the basic systems. The GSD data can be loaded into the cache database after each periodic deletion of the cache database by nightly file transfer or otherwise, so as to be immediately available there.

Most of the real asset data and real asset evaluation data registered in the WFE are stored by the IMMO service. The Pricing service, finally, is a component for calculating prices in the credit transaction. As well as the interests and conditions applying to the customer, also the entire underlying price structure is laid down in the Pricing service.

Implementation of the invention enables a considerable reduction in run-time and an accompanying shortening of response time, owing to the simplified and fast data sourcing (cache database) and use of the asynchronously started service requests. The cache database can act as a "post box" for service data in connection with the asynchronously started services. The individual user terminals can thus work through the often many dozens of HTML pages without interruption and without unnecessary waiting times. This appreciably accelerates the workflow.

To the specialist world it is obvious that numerous modifications and further developments of the invention are possible. For this reason the extent of the invention is limited only by the attached claims.

The invention claimed is:

1. A computer network system for workflow-based data processing, in particular in connection with a computer-aided credit decision, wherein as part of the workflow a plurality of display pages are provided interactively using workflow control commands, with the computer network system comprising:

a user terminal with a user interface that displays the plurality of display pages related to the computer-aided credit decision and that receives input of user data and workflow control commands; and one or more server systems comprising:

one or more sourcing systems configured to access sourcing databases that contain sourcing data related to the computer-aided credit decision and at least one cache database into which the user data and a selected extract from the sourcing data are loaded;

one or more service systems with services for performing data processing steps on the basis of data sourced from the cache database, and a mechanism comprising computer executable instructions stored in a memory of the computer network system configured to invoke, in response to the activation of at least one of the workflow control commands associated with a given display page of the plurality of pages displayed at the user terminal, at least one of the one or more services and the display of a new display page of the plurality of pages at the user terminal, wherein at least one of the services is invoked asynchronously with respect to the display of the new display page such that the new display page is displayed before the termination of the at least one invoked service if the setup of the new display page of the plurality of pages is independent of a result of the at least one invoked service.

2. The computer network system according to claim 1, wherein the at least one server further comprises at least one queue that serialises requests for asynchronous service invocations.

3. The computer network system according to claim 2, wherein the at least one server further comprises at least one worker process arranged functionally between the queue and the one or more service systems, the worker process being configured to read out the queue and to forward the read out requests to the one or more service systems.

4. The computer network system according to claim 3, wherein both data in the cache database and one or more services are allocated to at least one of the requests for an asynchronous service invocation, wherein, the worker process is further configured to read out from the cache database the data allocated to a given request and forward the data to the service allocated to the given request, upon reading out the given request from the queue.

5. The computer network system according to claim 3, wherein the worker process receives a response from the service system to which the given request was forwarded.

6. The computer network system according to claim 5, wherein the response contains service data passed on by the service system, and the worker process is further configured to write the service data into the cache database.

7. The computer network system according to claim 5, wherein the response contains a validation message in respect of the data passed to the service system.

8. The computer network system according to of claim 5, wherein the response provides information related to the status of the execution of the request and the worker process is further configured to make an appropriate status entry in for the given request in the queue or in a separate response queue.

9. The computer network system according to claim 1, wherein the one or more services are configured to store user data.

10. The computer network system according to claim 1, wherein the workflow control commands comprise a storage command.

11. The computer network system according to claim 1, wherein the workflow control commands comprise a command for displaying the new display page of the plurality of pages.

12. The computer network system according to claim 11, wherein the new display page of the plurality of pages is the display page following the given display page of the plurality of pages logically in the workflow.

13. The computer network system according to claim 1, wherein at least the sourcing data loaded into the cache database have limited validity.

14. The computer network system according to claim 1, wherein the one or more sourcing systems is further configured to delete the sourcing data loaded into the cache database at specific intervals and re-source the sourcing data.

15. The computer network system according to claim 1, wherein the at least one queue is created in the cache database.

16. A method for workflow-based data processing in particular in connection with a computer-aided credit decision, wherein as part of the workflow a plurality of display pages are provided through interactively using workflow control commands, comprising the steps:

providing a user terminal with a user interface that displays the plurality of pages related to the computer-aided credit decision and that receives input of user data and workflow control commands;

providing at least one cache database into which the user data and an extract of sourcing data selected from at least one sourcing database are loaded;

providing services for performing data processing steps on the basis of data sourced from the cache database; and invoking, in response to the activation of at least one of the workflow control commands associated with a given display page of the plurality of pages displayed at the user terminal, at least one of the services and the display of a new display page of the plurality of pages at the user terminal, the service being invoked asynchronously in respect of the display of the new display page such that the new display page is displayed before the termination of the at least one invoked service if the setup of the new display page of the plurality of pages is independent of a result of the at least one invoked service.

17. The method according to claim 16, further comprising; receiving service data back from the at least one service in response to the invocation of the at least one service; and storing the service data in the cache database.

18. The method according to claim 16, further comprising serialising requests for asynchronous service invocations in at least one queue.

19. The method according to claim 16, wherein the loading of the extract of sourcing data is done iteratively, in that the contents of the sourcing data read out from the sourcing database contain instructions as to which further sourcing data are to be loaded into the cache database.

20. A computer program product with program code means for performing the method according to claim 16 when the computer program product is running on a computer system.

21. The computer program product according to claim 20, stored on a computer-readable recording medium.

22. The computer network system according to claim 1, wherein mechanism is configured such that the at least one service is invoked synchronously with respect to the display of the new display page such that the new display page of the plurality of pages is displayed after the termination of the at least one invoked service if the setup of the new display page is dependent on the result of the at least one invoked service.

23. The method according to claim 16, wherein the at least one service is invoked synchronously with respect to the display of the new display page such that the new display page of the plurality of pages is displayed after the termination of the at least one invoked service if the setup of the new display page is dependent on the result of the at least one invoked service.

* * * * *